United States Patent
Baciu et al.

(10) Patent No.: US 7,925,558 B2
(45) Date of Patent: Apr. 12, 2011

(54) SYSTEM AND METHOD FOR COMMODITIZING BROWSING TIME IN A SELF-SERVICE STORE

(75) Inventors: Assaf Baciu, Berkeley, CA (US); Ryan J. Bush, Belmont, CA (US); Kevin M. Stone, Mountain View, CA (US)

(73) Assignee: Bevocal LLC, Sunnyvale, CA (US)

( * ) Notice: Subject to any disclaimer, the term of this patent is extended or adjusted under 35 U.S.C. 154(b) by 1214 days.

(21) Appl. No.: 11/486,664

(22) Filed: Jul. 14, 2006

(65) Prior Publication Data
US 2008/0015961 A1 Jan. 17, 2008

(51) Int. Cl.
*G06Q 40/00* (2006.01)
(52) U.S. Cl. .............. 705/35; 705/26; 705/39
(58) Field of Classification Search ............. 705/26, 705/35, 39
See application file for complete search history.

(56) References Cited

U.S. PATENT DOCUMENTS

| | | | |
|---|---|---|---|
| 2005/0131910 A1* | 6/2005 | Yanagisawa | 707/10 |
| 2005/0163296 A1* | 7/2005 | Smith et al. | 379/114.2 |
| 2007/0117584 A1* | 5/2007 | Davis et al. | 455/550.1 |

OTHER PUBLICATIONS

BeVocal Creates "Mobile Storefront"—a Self-Service Marketing and Distribution Channel for Wireless Carriers; Subscribers Use Their Voice to Shop for and Buy Services—Including More Than 1.2 Million Ringtones Business Wire. New York: Mar. 27, 2006. p. 1.*
Helping Customers Help Themselves With E-services James R Borck. InfoWorld. San Mateo: May 17, 2004. vol. 26, Iss. 20; p. S7 (4 pages).*
Comverse Establishes Key Relationship With VoiceObjects AG for Deployment Of VoiceXML Applications Business Editors/High-Tech Writers CeBIT 2003. Business Wire. New York: Mar. 11, 2003. p. 1.*
AT&T Wireless Launches Personalized 'One-to-One' Information Services; Talk to the Internet with Voice-based Internet Browsing powered by Tellme PR Newswire. New York: Jun. 12, 2001. p. 1.*

* cited by examiner

*Primary Examiner* — Lalita M Hamilton
(74) *Attorney, Agent, or Firm* — Tina M. Lessani; Lessani & Lessani LLP

(57) ABSTRACT

A system and method commoditize browsing time in a self-service store for a communication carrier. The method comprises communicating with a user, enabling the user to browse the store, tracking the amount of time the user spends browsing the store, calculating a charge, if any, for the amount of time the user spent browsing the store, and, if a charge is incurred, charging the user's account for such charge. In one embodiment, the self-service store is a voice store in which a user calls into the store. However, the invention is not limited to voice stores, and the invention could apply to stores accessed via text messaging, the web, etc. Communication with a user can be initiated by the user or by the self-service system.

21 Claims, 4 Drawing Sheets

SYSTEM AND METHOD FOR COMMODITIZING BROWSING TIME IN A SELF-SERVICE STORE

BACKGROUND OF THE INVENTION

1. Field of the Invention

This invention relates generally to self-service systems through which users can purchase products and, more specifically, to commoditizing browsing time in a store provided by a self-service system.

2. Description of the Background Art

Communication carriers often use interactive, automated self-service systems, such as BeVocal's automated storefront applications, to provide a store through which users can browse and purchase products. For instance, some communication carriers offer automated stores through a voice application, where a user can call into an IVR system to purchase service plans, features (e.g., text messaging, web services, etc), and other products, such as ringtones, games, and videos.

Carriers want to encourage customers to browse the store and purchase products, but they want to discourage excessive browsing that does not result in a purchase. Excessive browsing consumes resources of the self-service system and leads to higher costs for the carriers. Some customers of wireless phone communication carriers will, for entertainment, spend hours browsing a self-service voice store listening to sample ringtones without purchasing any ringtones or other products. Consequently, it is desirable to track and commoditize store browsing minutes in a way that will encourage purchases, discourage over-browsing, and increase revenue.

SUMMARY

The present invention provides a system and method for commoditizing browsing time in an automated, self-service store for a communication carrier. The method comprises communicating with a user, enabling the user to browse the store, tracking the amount of time the user spends browsing the store, calculating a charge, if any, for the amount of time the user spent browsing the store, and, if a charge is incurred, charging the user's account for such charge.

In one embodiment, the self-service store is a voice-activated application (a "voice store") into which a user calls. However, the invention is not limited to voice stores, and the invention could apply to stores accessed via text messaging, the web, etc. Communication with a user can be initiated by the user or by a self-service system.

In one embodiment, the self-service system is configurable in that carriers can set one or more rates at which the user will be charged for browsing the store. Rates can be tiered such that one rate (which can include a rate of zero dollars) applies for an initial period of time and then one or more subsequent rates apply afterwards. Rates can vary based on user profile, user plans, and promotions being offered by the carrier. In one embodiment, for prepaid accounts, the charge is applied by reducing the balance in the prepaid account. For postpaid accounts, where the user is subscriber to a monthly plan that provides the user with a certain number of communication minutes a month (such as "anytime" minutes, "nights and weekends" minutes, etc.), the charge can be applied by treating the number of minutes spent browsing the store as used communication minutes under the user's plan.

DETAILED DESCRIPTION OF THE PREFERRED EMBODIMENTS

Figure 1:
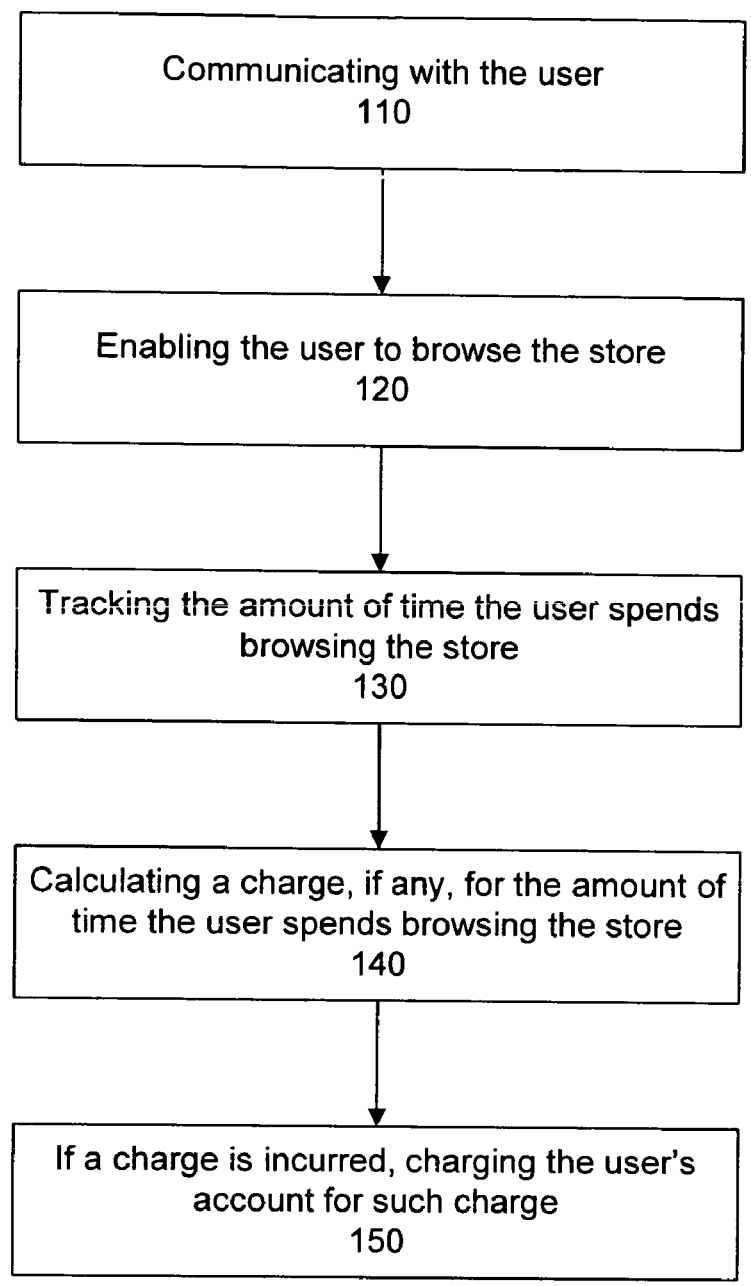
FIG. 1 is a flow chart that illustrates a method for commoditizing voice browsing minutes in a self-service store.

FIG. 1 illustrates a method for commoditizing browsing time in a self-service system that provides a store for a communication carrier. The method comprises communicating with a user (step 110), enabling the user to browse the store (step 120), tracking the amount of time the user spends browsing the store (step 130), calculating a charge, if any, for the amount of time the user spent browsing the store (step 140), and, if a charge is incurred, charging the user's account for such charge (step 150).

In one embodiment, the store provided by the self-service system is a voice-activated application (or "voice store") into which a user calls. However, the invention is not limited to voice stores, and the invention could apply to stores accessed via text messaging, the web, etc. Communication with a user can be initiated by the user or by the self-service system.

There are many ways in which store-browsing time may be commoditized. One rate can apply to all time equally, or there can be a tiered-rate system, where the rate increases or decreases over time. For instance, in one embodiment, the user may be able to browse the store for an initial period of time without incurring a charge, where such initial period of time may be measured over a per-call basis, per-month basis, or other time frame. In such embodiment, after such initial period of time, the user is charged for subsequent browsing time. There can be any number of rate tiers, and the rate or the amount of free browsing time provided can vary based on the user's profile, promotions being offered by the communication carrier, and other factors. Also, the self-system can be configured such that, if the user makes a purchase, the user is credited for browsing time that would otherwise be charged to the user. For example, if a user spends twenty minutes browsing the store and then purchases a ringtone, some or all of the twenty-minute-browsing charge can be credited back to the user. The user also can be credited for browsing time in exchange for providing personal information, such as an e-mail address.

In one embodiment, where there is a tiered-rate structure, the self-service system informs the user of the rate tiers. For instance, at the start of the communication, the user may be informed that he has a certain number of minutes to browse the store for free. After the user consumes the free minutes, the self-service system may inform the user that a charge will apply to subsequent browsing time.

The charge may be calculated and applied periodically while the user is browsing the store, or the charge may be calculated and applied after the browsing. The form the charge takes can depend on the type of account the user has with the communication carrier. For instance, the user may have a prepaid account that the user can use to communicate with others, browse the self-service store, and purchase products. In such case, any charge incurred for browsing may be applied by reducing the dollar value remaining on the user's prepaid account.

Alternately, the user may be a subscriber to a service plan with a communication carrier. For instance, the user may be a subscriber to a service plan with a wireless communication carrier, where the plan the user is on entitles the user to a certain number of communication minutes a month. In such case, charging the user's account for store-browsing minutes may involve treating the browsing minutes as used communication minutes under the user's service plan (i.e., the charge is in the form of communication minutes).

Figure 2:
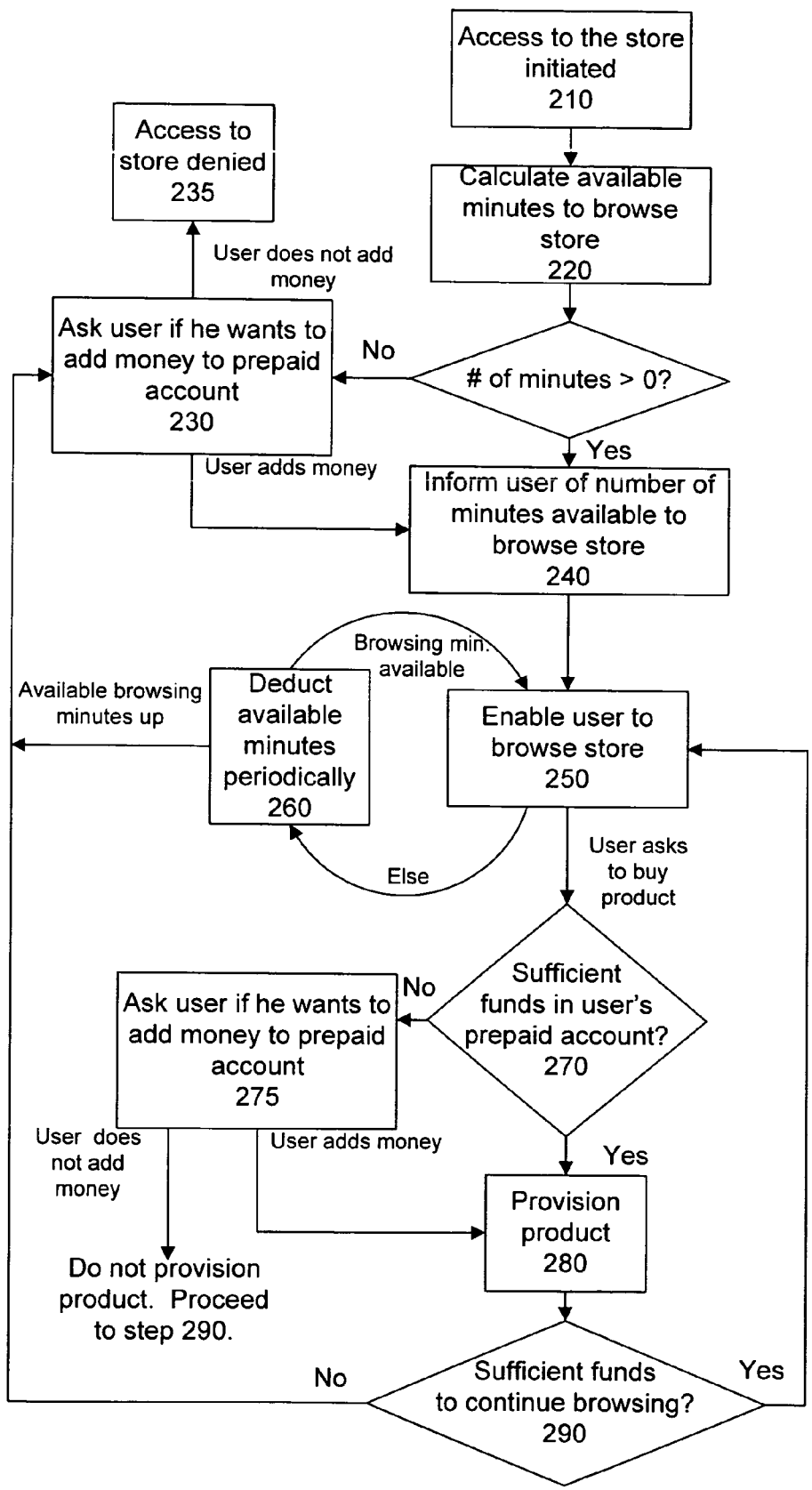
FIG. 2 is a flow chart that illustrates an implementation of the present invention, where the user has a prepaid account with the communication carrier.

FIG. 2 illustrates an implementation of the present invention where the user has a prepaid account with a communication carrier. This is just one way to implement the invention shown in FIG. 1, and the invention is in no way limited to the method described with respect to FIG. 2.

When access to the store is initiated (i.e., when the user attempts to access the store) (step 210), a self-service system calculates the number of minutes (or other unit of time) the user has available to browse the store based on the balance in the user's prepaid account and any free minutes allocated to the user (step 220). If there are no available minutes, the self-service system asks the user if he wants to add more money to his prepaid account (step 230). If the user adds money, the self-service system proceeds to step 240. Otherwise, access to the voice store is denied (step 235).

If the user has available minutes, the self-service system informs the user of the number of minutes available to browse the store (step 250). If there is tiered rate structure, the self-service system may inform the user of the tiers (e.g., "You may browse the store for 15 minutes for free. After that, a 5 cent per minute charge will apply.").

The self-service system then enables the user to browse the store (step 250) and deducts the available minutes remaining periodically as the user browses the store (step 260). If the user runs out of minutes while browsing the store, the self-service systems returns to step 230 to ask the user is he wants to add more money to his prepaid account.

If the user indicates that he desires to buy a product from the store, the self-service system determines if there are sufficient funds in the user's account (step 270). Before making this determination, the self-service system deducts any browsing charges incurred since the last deduction in step 260. If the user does not have sufficient funds, the self-service system asks the user if he wants to add money to his account (step 275). If the user adds sufficient money, the system proceeds to step 280. Otherwise, the system does not provision the product and goes to step 290.

If the user has sufficient funds, the self-service system provisions the product (280). In one embodiment, the self-service system also credits the user for all or some of the amount charged, if any, to the user for browsing the store.

The self-service system them determines if the user has sufficient funds to continue browsing the store (step 290). If so, the self-service system proceeds to step 250 and enables the use to browse the store. Otherwise, the self-service system goes to step 230 and asks the user if he wants to add money to his account.

Figure 3:
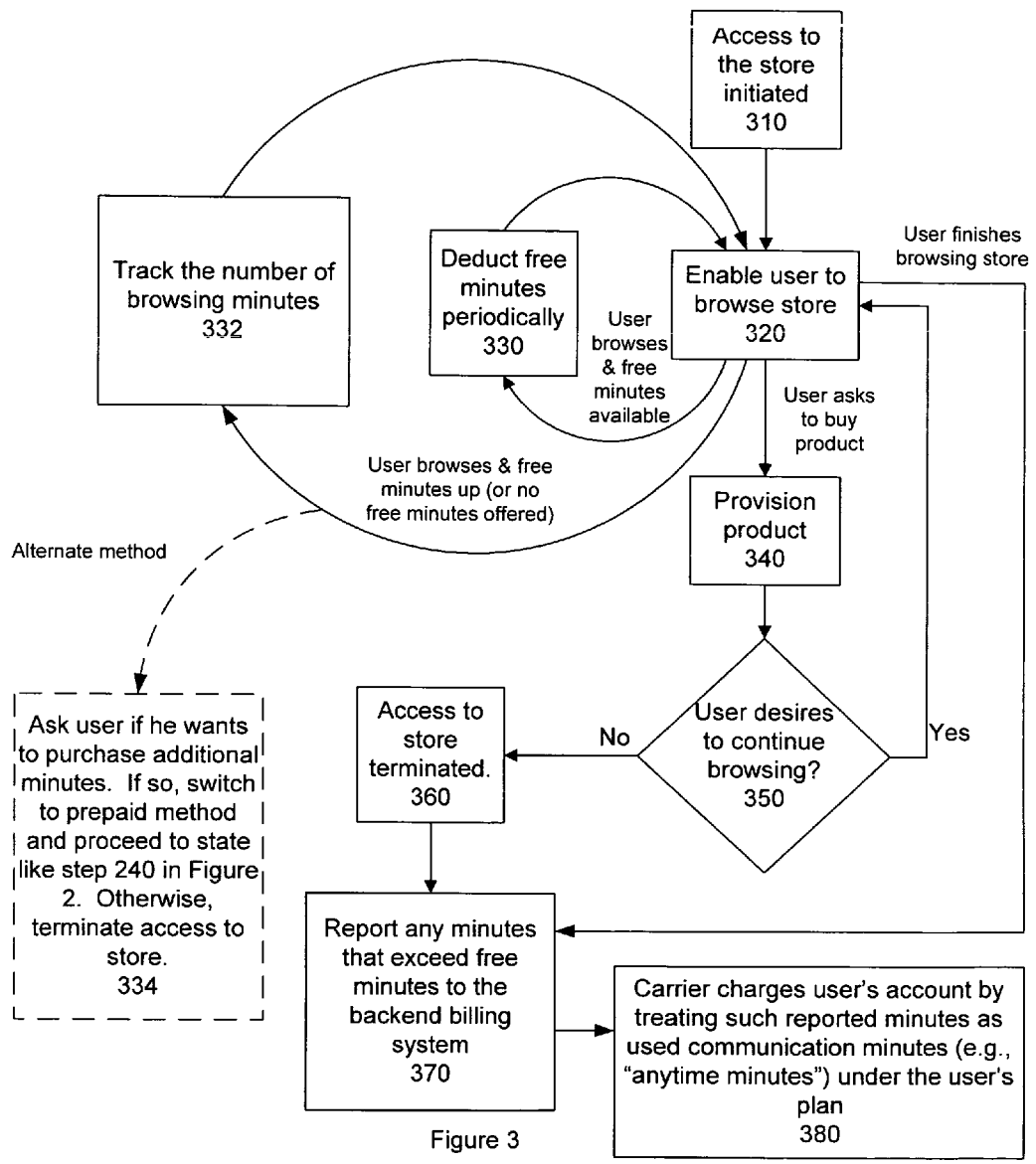
FIG. 3 is a flow chart that illustrates an alternate implementation of the present invention, where the user is a subscriber to a service plan with a communication carrier.

FIG. 3 illustrates an implementation of the present invention, where the user is a subscriber to a service plan with a communication carrier, where the service plan provides the user with a certain number of minutes each month to use for communications. This is just one way to implement the invention shown in FIG. 1, and the invention is in no way limited to the method described with respect to FIG. 3.

When access to the store is initiated (step 310), the self-service system enables the user to browse the store (step 320). If the user has a certain number of free minutes to browse the store, the self-service system deducts the user's browsing minutes from the available free minutes as the user browses the store (step 330). If the user does not have any available free minutes (or after the user consumes all the available free minutes), the self-service system keeps track of the number of minutes the user spends browsing the store (step 332). When the user finished browsing the store, the self-service systems reports any browsing minutes that exceed the free minutes (i.e., the minutes tracked in step 332) to an applicable billing system for the carrier. The carrier then charges the user's account by treating these reported minutes as used communication minutes (such as used "anytime" minutes) under the user's plan (i.e., the minutes are posted to the user's account). In one embodiment, if the user exceeds his allotted communication minutes for the current month, a monetary charge is posted to the user's account.

In an alternate embodiment, instead of treating all non-free browsing minutes as used communication minutes, the user may be asked to if he wants to pre-purchases browsing minutes (step 334). This may occur after the user consumes any available free minutes or after the user has used up all the communication minutes available to the user on his plan. In this embodiment, prior to performing steps 332 and 334, the self-service system may perform a check to determine whether store-browsing minutes can be charged to a user's account or whether the user must prepay for browsing minutes. If the user must prepay and does so, the self-service system switches to a "prepaid scenario" and proceeds to a state like step 240 in FIG. 2 (step 334). If the user must prepay and does not, the self-service system terminates access to the store (step 334).

If the user requests to purchase a product, the self-service system provisions the product (step 340). The self-service system asks the user if he wants to continue browsing the store (step 350). If the user desires to continue browsing the store, the system returns to step 320. Otherwise, access to the store is terminated (step 360) and the system proceeds to step 370.

Figure 4:
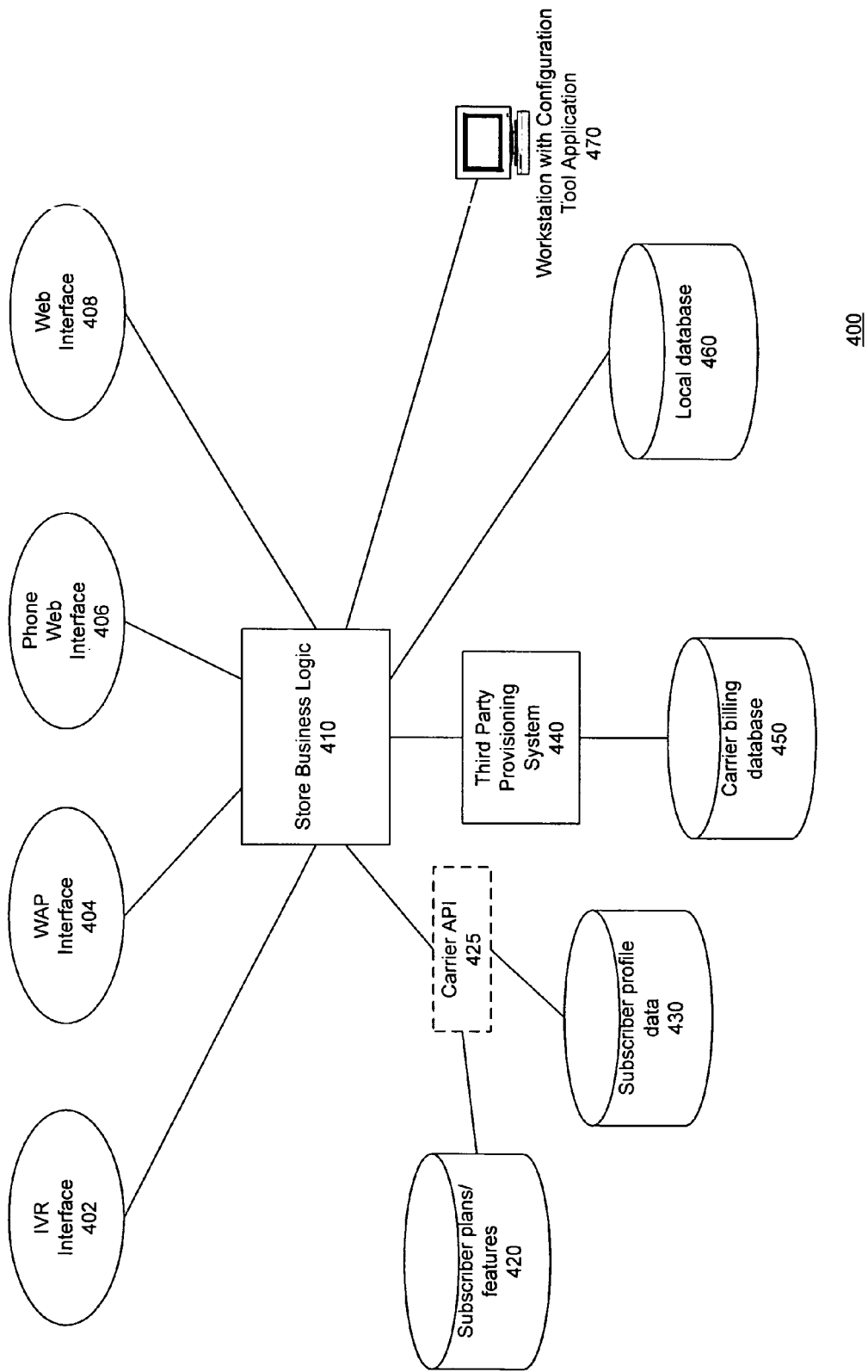
FIG. 4 is block diagram that illustrates an example architecture of a self-service system.

FIG. 4 illustrates an example architecture for a self-service system according to one embodiment of the present invention. The invention could be implemented by other types of self-service systems, and the invention is not limited to the architecture illustrated in FIG. 4.

The self-service system 400 of FIG. 4 includes a number of interfaces (402, 404, 406, 408) to different communications channels, such as phone, WAP, phone web, and web. Store business logic 410 implements the functionality described with respect to FIG. 1-3. It includes a provisioning engine (for provisioning products), and a conflict resolution engine (for identify and resolving conflicts with products). Conflict engines and provisioning engines are generally known in the art. The store business logic 410 has access to a subscriber plans/feature database 420, a subscriber profile database 430, a carrier billing database 450, and a local database 460. The subscriber plans/feature database 420 stores data on subscribers' postpaid and/or prepaid plans. The subscriber profile database 430 stores information about subscribers (name, address, etc.). Both of these databases are communication carrier databases and are accessed through a carrier API 425. The carrier billing database 450 stores billing information and may be accessed through a carrier API 425 or third party provisioning system 440. The local database 460 stores configuration information for the self-service system 400, as well information about the operation of the self-service system 400. Examples of the type of data that may be stored in the local database 460 include current promotions offered by the carrier, usage logs, and data for reporting purposes. The self-service system 400 also includes a configuration tool 470, which is a software application in which an administrator can configure how the browsing time will be commoditized. For instance, through such tool, an administrator can set up tiered rate structures for browsing time for various users, including how many minutes, if any, particular users can browse the store for free. The configuration tool 470 translates the entered data into rules used by the self-service system 400 in operating the store.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for commoditizing browsing time by a user in a self-service system that provides a voice store for a communication carrier, wherein the method is performed by the self-service system and wherein the user is a subscriber to a service plan with the communication carrier that provides the user with a certain amount of time each month to use for telecommunications, the method comprising:
communicating with the user;
enabling the user to browse the voice store via phone;
tracking the amount of time the user spends browsing the voice store via phone;
subtracting from the tracked time an amount, if any, of free time that the user is allotted to browse the store; and
in response to the user finishing browsing the voice store, reporting to the communication carrier any tracked time that exceeds the amount of free time allotted to the user, wherein the communication carrier charges the user for the reported time by treating the reported time as used time for communications under the user's service plan.

2. The method of claim 1, wherein communicating with the user includes:
informing the user that the user may browse the voice store for a certain amount of time for free, and
informing the user that, after the user consumes the free time, subsequent browsing minutes will be deducted from the monthly communication minutes provided under the user's service plan.

3. The method of claim 1, wherein the amount of free browsing time allotted the user is based on the user's profile.

4. The method of claim 1, wherein the amount of free browsing time allotted the user is based on a promotion offered by the communication carrier.

5. The method of claim 1, wherein free browsing time is offered in exchange for personal information.

6. The method of claim 1, further comprising informing the user of the amount of free time the user has available for browsing the store.

7. The method of claim 1, wherein the amount of free time allotted the user depends on the user's service plan.

8. The method of claim 1, wherein, when the user reaches the number of communication minutes allocated to the user for the current month, the self-service system enables the user to add a prepaid dollar value to the user's account, where such prepaid dollar value can be used for communication services, browsing the store, and purchasing products from the store.

9. The method of claim 1, further comprising informing the user when the user reaches his limit of the available communication minutes for the current month.

10. The method of claim 1, further comprising:
in response to the user requesting to purchase a product from the voice store, provisioning the product.

11. The method of claim 10, further comprising:
in response to the user purchasing the product from the voice store, increasing the amount of free time allotted to the user to browse the voice store.

12. A computer program embodied on a computer-readable medium and comprising code, that, when executed by a computer, enables the computer to perform the following:
communicate with a subscriber to a service plan with a communication carrier, wherein the service plan provides the subscriber with a certain number of minutes each month to use for telecommunications;
enable the subscriber to browser a voice store via phone;
track the amount of time the user spends browsing the store via phone;
subtract from the tracked time an amount, if any, of free time that the subscriber is allotted to browse the store; and
in response to the user finishing browsing the voice store, report to the communication carrier any tracked time that exceeds the amount of free time allotted to the subscriber, wherein the communication carrier charges the subscriber for the reported time by treating the reported time as used minutes under the subscriber's service plan.

13. The computer program product of claim 12 further comprising:
in response to the subscriber requesting to purchase a product from the voice store, provisioning the product.

14. The computer program product of claim 13 further comprising:
in response to the user purchasing the product from the voice store, increasing the amount of free time allotted to the user to browse the voice store.

15. The method of claim 14, further comprising:
in response to the user purchasing the product from the voice store, increasing the amount of free browsing time available to the user to browse the voice store.

16. A self-service system for providing a voice storefront interface for a wireless communication carrier store and for commoditizing browsing time by a user in the voice store, wherein the user is a subscriber to a service plan with the communication carrier that provides the users with a certain number of minutes each month to user for telecommunications, the system comprising:
store business logic for enabling the user to browse the store via phone, tracking the amount of time the user spends browsing the store via phone, subtracting from the tracked time an amount, if any, of free time that is the user is allotted to browse the store; and in response to the user finishing browsing the voice store, reporting to the communication carrier any tracked time that exceeds the amount of free time allotted to the user to enable the communication carrier to treat such tracked time as used telecommunication minutes under the user's service plan;
a phone interface that provides an interface between a phone network and the store business logic; and
a configuration tool for configuring the self service system, where the configuration tool creates rules that are used by the store business logic.

17. A method for commoditizing browsing time in a self-service system that provides a voice store for a communication carrier, where a user of the voice store is a subscriber to a service plan with the communication carrier that provides the user with a certain number of communication minutes, the method comprising:
enabling the user to browse the voice store;
if browsing time is available to the user, deducting time spent browsing the voice store from the available free browsing time; and if no free browsing time is available, tracking non-free time spent browsing the voice store, and, after the user finishes browsing the store, reporting such tracked time to the communication carrier to enable the communication carrier to treat such tracked time as used communication minutes under the user's service plan.

18. The method of claim 17, further comprising:

in response to the user requesting to purchase a product from the voice store, provisioning the product.

19. The method of claim 17, wherein the amount of free browsing time allotted to the user is based on the user's profile.

20. The method of claim 17, wherein the amount of free browsing time allotted to the user is based on a promotion offered by the communication carrier.

21. The method of claim 17, wherein the amount of free time allotted the user depends on the user's service plan.

* * * * *